United States Patent [19]

Magill

[11] 3,808,626
[45] May 7, 1974

[54] SELF-CONTAINED MOBILE PASSENGER BRIDGE FOR AIPLANE LOADING AND UNLOADING OPERATIONS

[76] Inventor: John Willett Magill, 643 S. Oak Knoll Ave., Pasadena, Calif. 91106

[22] Filed: Aug. 28, 1972

[21] Appl. No.: 284,229

Related U.S. Application Data

[63] Continuation of Ser. No. 70,148, Sept. 8, 1970, abandoned.

[52] U.S. Cl. .................................................. 14/71
[51] Int. Cl. ............................................ B65g 11/00
[58] Field of Search ........................................ 14/71

[56] References Cited
UNITED STATES PATENTS

| | | | |
|---|---|---|---|
| 3,581,331 | 6/1971 | Fisher | 14/71 |
| 3,608,119 | 9/1971 | Van Marle | 14/71 |
| 3,060,471 | 10/1962 | Der Yuen | 14/71 |
| 3,184,772 | 5/1965 | Moore | 14/71 |
| 3,412,412 | 11/1968 | Kjerulf | 14/71 |
| 3,404,417 | 10/1968 | Wollard | 14/71 |
| 3,462,784 | 8/1969 | Seipos | 14/71 |

Primary Examiner—Nile C. Byers, Jr.
Attorney, Agent, or Firm—Norman H. Gerlach

[57] ABSTRACT

A mobile passenger bridge which is of tunnel-like design, is extensible and contractible and open at both ends, has steerable wheels adjacent to its opposite ends, and is supported on its wheels by way of vertically adjustable supporting assemblies so that the ends thereof may be individually and adjustably raised and lowered. The bridge is motorized so that it may be driven over the ground and the ends thereof individually and selectively steered from a storage location to a position wherein one open end thereof may be operatively connected to the distal end of a swing-type loading ramp leading from a depot building doorway and the other open end connected to one of the doorways in the fuselage of an aircraft. Hydraulic equipment and manually operable controls therefor are provided so that the bridge may be maneuvered into an approximate position and then adjusted for proper height, inclination and length so that an approximately in-line passageway between the loading ramp and the airplane is provided.

2 Claims, 5 Drawing Figures

INVENTOR:
JOHN W. MAGILL

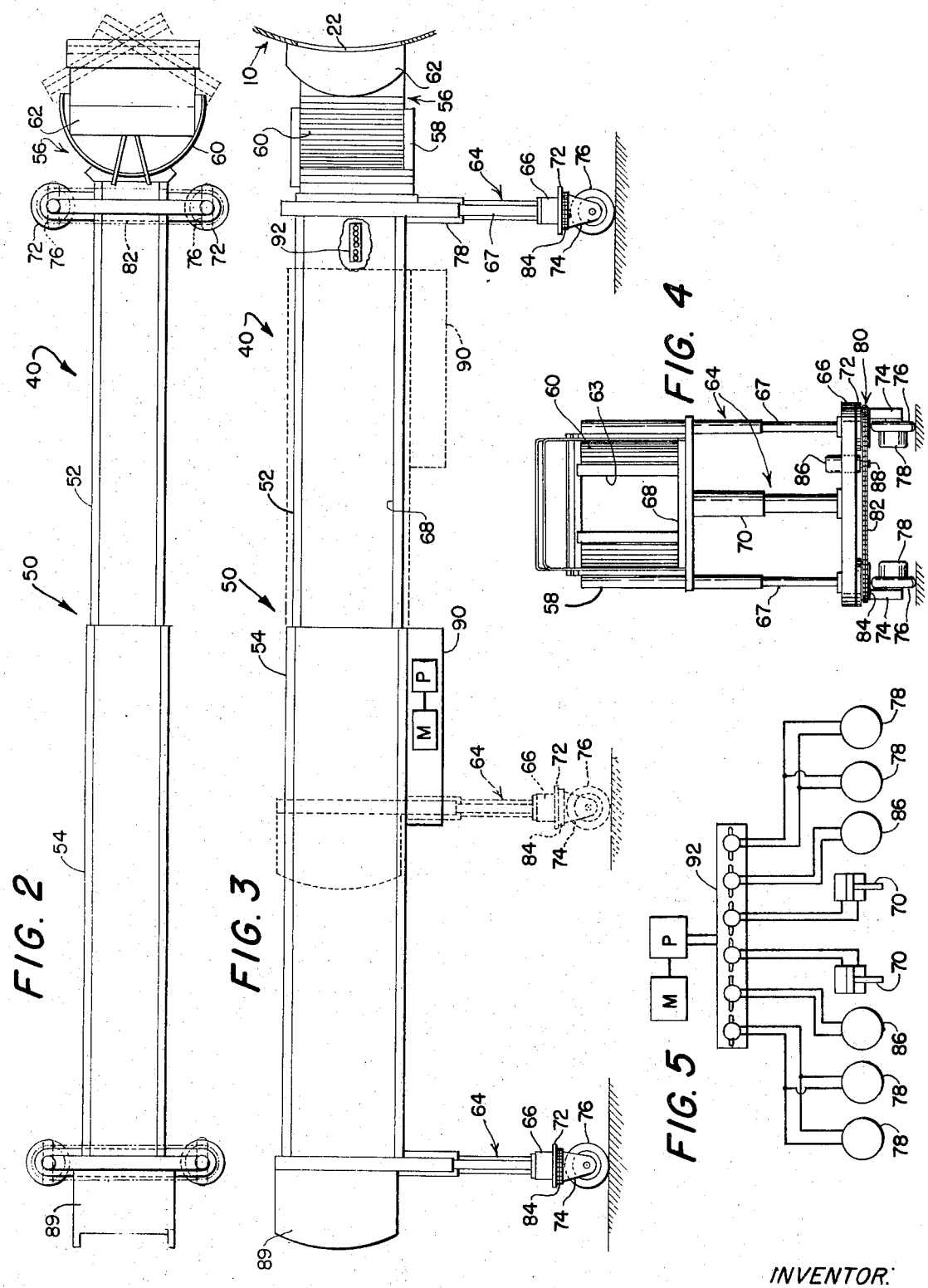

SELF-CONTAINED MOBILE PASSENGER BRIDGE FOR AIPLANE LOADING AND UNLOADING OPERATIONS

This application is a continuation of my now abandoned United States Patent application Ser. No. 70,148, filed on Sept. 8, 1970 and entitled "SELF-CONTAINED MOBILE PASSENGER BRIDGE FOR AIRPLANE LOADING AND UNLOADING OPERATIONS."

The present invention relates generally to a mobile passenger bridge which is intended primarily to extend the usefulness of and be employed in connection with a conventional swing-type passenger loading and unloading ramp such as is commonly used at an airport, the bridge when in proper use being adapted to permit the associated ramp to communicate with the rear or behind-the-wing combined entrance and exit doorway in a grounded and parked airplane at the airport without necessitating positioning of the ramp over any portion of the wing of the airplane. The invention is not necessarily limited to such use and the mobile passenger bridge constituting the present invention may, if desired and without modification, be used individually as a passenger loading and unloading ramp for establishing a direct passageway between a combined entrance and exit doorway of a passenger depot building at the airport and a front doorway in a parked airplane to be loaded or unloaded.

In general, passenger ramps, regardless of their design and construction, are possessed of numerous limitations, particularly when such ramps are employed for loading and unloading passengers or cargo with respect to an aircraft or airplane having a behind-the-wing doorway. The general position of the grounded and parked airplane in its loading and unloading position and the location of the wing of the airplane are never exact positions and, furthermore, they vary according to the design of different airplanes arriving successively at the airport. Therefore, the loading ramps are required to be maneuverable and capable of articulation in a large number of ways in order to accommodate varying heights of airplane doorways and different walking distances. Since the wings of modern airplanes are rapidly increasing in length, they present obstacles to proper ramp positioning, and where behind-the-wing doorways are to serve for loading and unloading, it is invariably necessary to maneuver the ramp into position directly above the airplane wing. This requires delicate and difficult maneuvering lest the wing become damaged by contact with the ramp as it is being brought into and out of its operative position. An above-the-wing ramp is currently regarded as a menace to any airport.

The present invention is designed to overcome the above-noted limitation that is attendant upon the construction and use of present-day passenger loading and unloading ramps and, accordingly, it contemplates the provision of a novel passenger ramp adjunct in the form of a self-propelled, mobile, tractionally driven, steerable, tunnel-like passenger bridge which, although of elongated design, is extensible and contractible in order to accommodate the passenger distance to be traveled. Individually steerable pairs of motorized wheels at opposite ends of the bridge afford a wide range of maneuverability as well as a 180° steering angle at each end of the bridge. Furthermore, the individual tractional drive which is provided for each pair of wheels is used to control the extensibility of the bridge as a whole. The bridge body or chassis is mounted on pylon assemblies which project upwardly from the pairs of wheels and hydraulic means are provided for selectively raising the opposite ends of the bridge in order to adjust bridge inclination and thus accommodate any difference level between the passenger doorways which the bridge is adapted to connect. By such an arrangement, the present passenger bridge may readily be operated to bring it into position between the distal end of a conventional passenger ramp and a behind-the-wing doorway of an airplane which is in a loading or unloading position at the airport at which the bridge is used. Instead of maneuvering the ramp so that it overlies the wing of the airplane being loaded or unloaded as is currently the practice, the ramp may be positioned so that its distal end lies outside the adjacent tip of the wing and just rearwardly thereof so that it is in lateral register with the behind-the-wing doorway through which loading or unloading is to take place. The passenger bridge may then, while in a condition of minimum length, be driven tractionally from its usual storage place at the airport and then brought to a standstill in a position of approximate alignment with the ramp distal end and the rear or behind-the-wing doorway in the fuselage of the airplane to be loaded or unloaded doorway. Thereafter, the opposite ends of the bridge may be raised to the proper levels so that the bridge is truly in alignment with said ramp distal end and said airplane doorway, after which the bridge may be extended to cause mating of the opposite ends of the bridge with the adjacent ramp and airplane structures. Conventional seals at the opposite ends of the bridge establish the necessary mating or interconnection of the bridge ends and the aforesaid ramp and airplane structures. With the bridge thus in position, the operator of the bridge may then leave the bridge and the passengers may pass from the combined entrance and exit doorway of the passenger depot building at the airport, first through the longitudinally extending ramp and then through the laterally extending and interconnecting bridge and enter the airplane by way of the latter's rear doorway. When unloading passengers from the plane, the bridge is maneuvered into the position described above and the passengers leave by passing first through the bridge, and then through the ramp, and finally through the doorway of the depot building and into the building.

After the bridge has served its purpose either for loading or unloading of passengers or cargo, it may be collapsed or contracted and then tractionally maneuvered according to the judgment of the operator and driven to its storage location to await a subsequent use.

In general, it is contemplated that the inclination of the ramp and its associated passenger bridge shall, during any given loading or unloading operation, remain substantially the same. In other words, the operator of the ramp and the operator of the bridge of the present invention will endeavor to adjust their respective structures so that the angle of the ramp will be the same as the angle of the passenger bridge to the end that the passengers will not encounter any sudden change in inclination while proceeding between the doorway of the depot building and the doorway in the rear portion of the airplane fuselage. However, under certain circumstances, it may be found advisable to cause the ramp and bridge structures to assume different inclinations.

The provision of a passenger bridge such as has been briefly outlined above and possessing the stated advantages constitutes the principal object of the present invention. Other objects and advantages of the invention, not at this time enumerated, will readily suggest themselves as the following description ensues.

The invention consists in the several novel features which are hereinafter described and are more particularly defined by the claims at the conclusion hereof.

In the accompanying two sheets of drawings forming a part of this specification, one illustrative embodiment of the invention is illustrated, largely in a schematic manner.

In these drawings:

FIG. 2 is a top plan view of the passenger bridge, showing the same in its fully extended and fully elevated condition;

FIG. 3 is a side view of the structure of FIG. 2;

FIG. 4 is an end view of the end of the passenger bridge which is adapted to be placed in register with the airplane doorway; and FIG. 5 is a schematic circuit diagram of the control instrumentalities which are associated with and form a part of the present passenger bridge.

Figure 1:
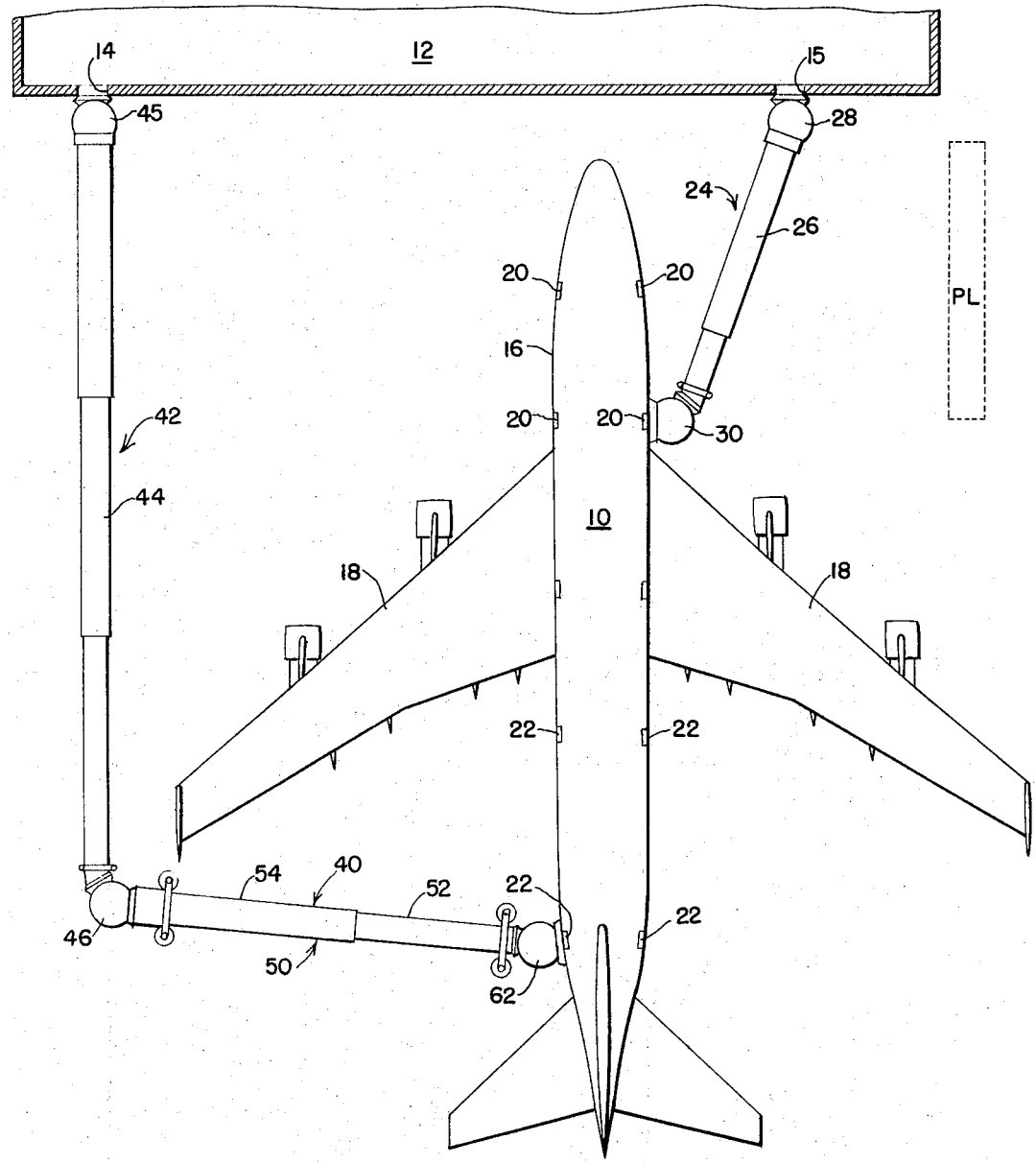
FIG. 1 is a plan view showing the mobile passenger bridge constituting the present invention operatively positioned for passenger or cargo loading or unloading operations between the distal end of a conventional swing-type passenger ramp and a behind-the-wing combined entrance and exit doorway in the rear portion of the fuselage of a large-sized airplane.

Referring now to the drawings in detail and in particular to FIG. 1, a commercial transportation vehicle in the form of an airplane 10 is shown as assuming a grounded and parked position with respect to an airport building which is fragmentarily illustrated and designated by the reference numeral 12. The building 12 is assumed herein to be a passenger depot where passengers gather preparatory to boarding the airplane 10, but it may be a warehouse for storing cargo which is to be loaded into the airplane. The building is provided with doorways 14 and 15 through which passengers walk when boarding or leaving the airplane 10.

The illustrated airplane has an elongated fuselage 16 which is provided with a wing structure 18. For illustrative purposes herein, the fuselage is provided with a plurality of forward combined entrance and exit doorways 20 which are disposed at the sides of the fuselage and forwardly of the wing structure 18. Rear combined entrance and exit doorways 22 are formed in the sides of the fuselage 16 rearwardly of the wing structure.

The problems which are incident to loading and unloading of the airplane 10 through the rear doorways 22 are not present in connection with loading and unloading through any properly selected front doorway 20 due to the unobstructed in-line opposition of the doorway 15 and either of the two doorways 20 on the near side of the airplane fuselage. Therefore, such loading or unloading may be accomplished by the use of a conventional swing-type passenger bridge or ramp 24 and is operatively and pivotally connected at its proximal end to the portion of the depot building 12 which defines the doorway 14. As shown in FIG. 1, when the ramp 24 is in its operative position of use, the distal end thereof is positioned adjacent to the selected front doorway 20 in the near side of the airplane fuselage 16. Various forms of passenger ramps are suitable for use in connecting the door 15 to the selected front doorway 20. The ramp is schematically illustrated herein, and briefly, it comprises a two-part telescopic tunnel structure 26 which is provided at its proximate end with a rotunda-type door seal 28, the latter being designed for permanent mating and connection with the depot building structure which defines the door 15. The distal end of the ramp 24 is provided with a second rotunda-type door seal 30 which is designed for temporary mating with any of the near front doorways 20 of the airplane 10, it being assumed, of course, that the airplane will be so positioned with respect to the airport depot building 12 that a direct line will exist between the doorway 15 and the selected front doorway 20. A suitable wheel-equipped supporting assembly (not shown) which is tractionally supported from the ground is provided in order to attain the necessary elevation of the distal end of the ramp 24 to secure mating of the rotunda-type door seal 30 with the front doorway 20.

Heretofore, as previously stated, when loading the airplane 10 through a given rear or behind-the-wing doorway 22, it has been the practice to utilize a swing-type passenger bridge or ramp similar to the ramp 24 and to cause such ramp to pass over the subjacent portion of the wing structure 18 of the airplane. According to the present invention, the danger which is involved in doing this is obviated by utilizing a second and novel mobile passenger bridge 40 and causing this bridge to be connected between the distal end of a conventional, swing-type ramp 42 and the selected behind-the-wing doorway 22. The ramp 42 may be positioned so that it entirely clears the span of the wing structure and is designed for connection to the passenger bridge 40.

The ramp 42 which is illustrated herein is similar to the conventional ramp 24 and likewise is purely conventional. In general, it comprises a horizontally elongated, three-part, telescopic tunnel structure 44, a proximal stationary rotunda-type door seal 45 which is operatively and permanently connected to that portion of the building structure that defines the doorway 14, and a distal movable rotunda-type door seal 46 which ordinarily is designed for connection to any selected airplane doorway, but which, according to the present invention, is operatively connected to the mobile passenger bridge 40 in a manner that will be described subsequently. It is to be understood that the ramp 42 is provided at its distal end with the usual wheel-equipped supporting assembly (not shown) whereby the rotunda-type door seal 46 may be brought to a suitable elevation for register with any airplane doorway to which it is to be attached or connected. The ramp 42 also is provided with suitable hydraulic or other control devices by means of which its angularity with respect to the building wall from which it projects may be varied at will.

In the particular loading or unloading situation which is illustrated in FIG. 1 of the drawings, the ramp 42 projects away from the wall of the airport depot building 12 at an angle of approximately 90° and its distal end terminates in close proximity to the adjacent tip of the wing structure 18 of the airplane 10 and slightly rearwardly thereof. The movable rotunda-type door seal 46, therefore, directly opposes the adjacent rear doorway 22 in the port side of the airplane fuselage 16 so that the passenger bridge 40 may be operatively connected between the door seal 46 and such doorway.

Referring now to FIGS. 2, 3 and 4, the mobile passenger bridge 40 of the present invention involves in its general organization a tunnel-like tubular body portion in the form of a two-part telescopic tunnel structure 50 consisting of a front tunnel section 52 and a rear tunnel section 54. The tunnel structure 50 is extensible and contractible between the full length condition in which it is shown in FIG. 3 in full lines and the fully collapsed condition in which it is shown in dotted lines. It will be understood, of course, that suitable guide rails or guideways are provided for maintaining the two tunnel sections 52 and 54 in coaxial alignment in any relative position of the sections. The sections 52 and 54, in any extended or collapsed position thereof, establish an interior passageway through which passengers are adapted to walk when proceeding from the distal end of the ramp 42 (see FIG. 1) to the adjacent rear doorway 22 of the airplane 10, or vice versa.

The front tunnel section 52 is provided at its outer end with a conventional movable rotunda-type door seal 56, the latter comprising a bridgehead 58 which supports a pair of bellows-like side walls 60, and a pivoted vestibule 62 which is capable of assuming different angular positions as shown in dotted lines in FIG. 2 in order to accommodate different incidence angles which are associated with doorway positioning when the airplane 10 is resting at different altitudes. The vestibule 62 provides a central door opening 63 (see FIG. 4).

The outer end of the front tunnel section 52 is supported on a vertically adjustable front supporting assembly 64 (see FIG. 4) which projects upwardly from a front truck platform 66 and includes a pair of telescopic guide sleeve and post assemblies 67 which extend between the truck 66 and the floor 68 of the front tunnel section 52. Said front supporting assembly 64 also includes an hydraulic cylinder and plunger assembly 70 and it also extends between the front truck platform 66 and said floor 68.

Rotatably mounted on the underneath side of the front truck platform 66 adjacent to the opposite lateral edges of said truck is a pair of rotatable steering mounts 72, each of which carries a depending wheel and motor mount 74, the latter serving to support a traction wheel 76 and its associated reversible hydraulic driving motor 78. The two steering mounts 72 are cooperatively connected together for rotation in unison by a chain and sprocket arrangement 80 including an endless chain 82 (see FIG. 4) which passes around a pair of sprockets 84, the latter being carried by the steering mounts 72. A reversible hydraulic steering motor 86, which is mounted on the front truck 66, drives a steering sprocket 88 which meshes at diametrically disposed regions with the endless chain 82. The chain and sprocket arrangement 80 is so adjusted that a zero wheel camber is maintained with the general planes of the two wheels 76 remaining parallel at all times regardless of their tractional rolling direction.

The outer end of the rear tunnel section 54 of the tunnel structure 50 is similarly mounted on traction wheels and is capable of being raised and lowered by a vertically adjustable supporting assembly which is similar to the front supporting assembly 64. In order to avoid needless repetition of description, the entire rear supporting assembly for the outer end of the rear tunnel section 54, including the truck, sleeve and post assemblies, mounts, traction wheels and steering motors, etc., is identified in the drawings by identical reference numerals as between the corresponding parts of the two supporting assemblies. A fixed combined entrance and exit vestibule 89 is provided at the outer end of the rear tunnel section 54 of the tunnel structure 50 of the mobile passenger bridge 40.

It is contemplated that the various hydraulic motors 78 and 86 and the cylinder and plunger assemblies 70 will be supplied with hydraulic fluid from a pump P (see FIGS. 3 and 5) which is driven by an electric motor M or other prime mover, the pump and its driving motor being enclosed in a housing 90 beneath the floor of the rear tunnel section 54. It is also contemplated that a suitable control panel 92 will be provided at a suitable location within the passageway which is afforded by the tunnel structure 50 of the passenger bridge 40. Accordingly, the control panel 92 is shown as being operatively installed on one side wall of the front tunnel section 52 at an elevation where it is in an out-of-the-way position with respect to the passengers as they walk through the passageway.

In FIG. 5 an hydraulic circuit diagram of the cylinder and plunger assemblies 70 and the hydraulic motors 78 and 86 is shown and includes the aforementioned control panel 92 which is of the reversible control handle type. Solenoid valves and other conventional directional devices which are required for the selective admission of pressure fluid to the various hydraulic components or units of the system have not been illustrated in the drawings, but it will be understood that such valves and directional devices, as well as the electrical components which are associated therewith, will be disposed variously in the housing 90 and at the control panel 92.

Ordinarily, the passenger bridge 40, when not in use, will assume a parked position alongside the depot building 12 at a selected and suitable parking location PL such as is schematically illustrated by the dotted line disclosure in FIG. 1 of the drawings. Upon arrival of an airplane such as the airplane 10 and after the same has come to rest in a loading position in front of the depot building 12, a first operator will manipulate the swing-type ramp 42 so as to extend the same so that the distal rotunda-type door seal 46 assumes a position adjacent to but slightly rearwardly of the adjacent (port) tip of the wing structure 18 as shown in FIG. 1. At the same time, the operator preferably will ascertain an approximate inclination for the three-part telescopic tunnel structure 44 wherein the door seal 46 is raised from ground level to a height which is such that when the passenger bridge 40 is connected between the door seal 46 and the selected behind-the-wing doorway 22, there will be through the ramp 42 and the bridge 40 a continuous passageway which does not involve an abrupt change in the angle of passenger ascendency or descendency. Alternatively, the door seal 46 of the conventional ramp 42 may be brought to full doorway height so that when the passenger bridge 40 is in place, the latter affords a final horizontal passageway for entry of the passengers into the airplane or departure of the passengers from the grounded and parked airplane.

At such time as the passenger ramp 42 has thus been adjusted, the same, or a different, operator will enter the parked passenger bridge 40 and energize the motor M, after which he may manipulate his controls at the control panel 90 in such a manner as to bring the bridge 40 from its parked position to an approximate loading position wherein its forward rotunda-type door seal 56 and its associated vestibule 62 are in the proximity of the selected rear doorway 22 in the airplane fuselage 16, while the fixed vestibule 89 at the outer end of the rear tunnel section 54 of the tunnel structure 50 is in the general vicinity of the elevated door seal 46 of the now extended passenger ramp 42. Such tractional movement of the passenger bridge 40 over the surface of the ground will be under the control of the operator and at his discretion, the operator manipulating his controls so as selectively to energize the wheel motors 78 and the steering motors 86 in appropriate directions, individually or simultaneously, until the desired positioning of the bridge 40 with respect to the ramp 42 and the airplane 10 is attained.

With the passenger bridge 40 in the approximate position of register with the door seal 46 of the ramp 42 and the selected rear doorway 22 as previously described, the operator will then cause energization of the cylinder and plunger assemblies 70 at the opposite ends of the bridge 40 in order to bring said opposite ends of the bridge to door seal and doorway level, respectively. When bridge alignment has thus been attained by the operator, the front wheel motors 78 and the front steering motor 86 may be energized tractionally to shift the bridge 40 axially toward the selected rear doorway 22 and effect an interlock between the movable rotunda-type door seal 56 and the selected rear doorway 22. Thereafter, the rear wheel motors 78 and the rear steering motor 86 may be energized so that the rear tunnel section 54 will move tractionally over the ground toward the door seal 46 of the ramp 42 while the front tunnel section 52 will remain anchored to the airplane 10. As soon as an interlock or mating engagement is effected between the vestibule 89 at the outer end of the rear tunnel section 54 of the passenger bridge 40 and the movable rotunda-type door seal 46 of the passenger ramp 42, the ramp and bridge are ready to receive either boarding or deplaning passengers.

The foregoing description of the operation of the passenger bridge 40 in gringing the same from the normal parked position thereof into an operative ramp and airplane-connecting position is merely exemplary of a specific use to which the passenger bridge 40 may be put and the control operations heretofore mentioned are exemplary of one of many ways in which the bridge may be manipulated to bring it into an operative position. The specific sequence of control operations may, of course, be varied according to the dictates and judgment of the operator. For example, and if desired, the operator may elect to effect a desired bridge inclination or a desired bridge elevation prior to effecting tractional movement of the bridge. It is to be noted that the rotatable steering mounts 72 of the two supporting assemblies 64 are capable of being turned about their respective axes so that wheel traction may take place in a lateral direction at right angles to the longitudinal axis of the bridge and so that, when necessary, either end of the bridge may be shifted laterally or, if desired, the entire bridge as a whole may be propelled sidewise. Such sidewise propelling of the bridge may be found useful in tight situation where the bridge must be "squeezed into position," so to speak, in order to attain bridge alignment with two doorways which are separated from each other by a distance only slightly longer than the length of the bridge when the latter is in its fully collapsed or contracted condition. It is to be noted from an inspection of FIG. 1 that the passenger bridge 40 may readily be manipulated so that it can be connected between the door seal 46 of the passenger ramp 42 and the rear doorway 22 which lies between the rearmost port doorway and the wing structure 18 of the airplane 10. It is also to be noted that in a situation when an airplane such as the airplane 10 is in a loading position on the left side of the doorway 14 of the depot building 12, the starboard behind-the-wing doorways 22 are capable of readily being served by the present passenger bridge 40, the connection between the door seal 46 of the passenger ramp 42 and the selected starboard doorway 22 being made in a manner similar to that described in connection with the port rear doorways.

The invention is not to be understood as restricted to the details set forth since these may be modified within the scope of the appended claims without departing from the spirit or scope of the invention.

Having thus described the invention what I claim as new and desire to secure by letters patent is:

1. An independently mobile loading bridge for bridging the gap between an exit opening in a passenger ramp leading from a depot building and a doorway in the fuselage of an airplane, said bridge being completely self-propelled and comprising an elongated extensible and contractible tunnel structure consisting of two telescopic tunnel sections, each section including a tunnel floor, a pair of vertically extending laterally spaced guide sleeves mounted on the outer end regions of each tunnel section, a guide post telescopically received in each guide sleeve and projecting downwardly therefrom, a truck platform carried by the lower ends of each pair of guide posts and bridging the distance therebetween, an hydraulic piston and cylinder assembly extending between each tunnel floor and the associated truck platform midway between the associated guide sleeves and posts, a pair of laterally spaced steering mounts rotatably mounted on the underneath side of the end regions of each truck platform, means operatively connecting said steering mounts for movement in unison, a reversible steering motor carried by each truck platform, means operatively connecting each motor to its associated steering mount in driving relationship, a traction wheel on each steering mount, a pair of reversible hydraulic driving motors on each steering mount and operatively connected to the respective traction wheel in driving relationship, means for selectively energizing said pairs of driving motors to rotate their respective traction wheels in opposite directions and thus effect elongation and contraction of the tunnel structure tractionally under the control of such selective energization of the motors, means for selectively energizing said hydraulic piston and cylinder assemblies to extend and contract the same whereby the outer ends of the bridge may be raised and lowered, and means disposed at the opposite ends of said bridge for connection thereof to and communication thereof with said doorway and exit opening in said passenger ramp respectively.

2. An independently mobile loading bridge as set forth in claim 1 and wherein said steering mount connecting means comprises a sprocket on each steering mount, and an endless chain operatively connecting the sprockets of each pair of steering mounts, and the means for connecting the motor to the steering mounts comprises a steering sprocket meshing with the associated endless chain at diametrically spaced regions and operatively connected to the associated steering motor.

\* \* \* \* \*